May 31, 1966     D. SONNABEND     3,253,423
CRYOGENIC COOLING ARRANGEMENT FOR SPACE VEHICLES
Filed Oct. 22, 1962     3 Sheets-Sheet 1

INVENTOR.
DAVID SONNABEND
BY Victor R. Beckman
ATTORNEY

May 31, 1966  D. SONNABEND  3,253,423
CRYOGENIC COOLING ARRANGEMENT FOR SPACE VEHICLES
Filed Oct. 22, 1962  3 Sheets-Sheet 2

INVENTOR.
DAVID SONNABEND
BY Victor R. Beckman
ATTORNEY

May 31, 1966 D. SONNABEND 3,253,423
CRYOGENIC COOLING ARRANGEMENT FOR SPACE VEHICLES
Filed Oct. 22, 1962 3 Sheets-Sheet 3

INVENTOR.
DAVID SONNABEND
BY Victor R. Beckman
ATTORNEY

United States Patent Office 3,253,423
Patented May 31, 1966

3,253,423
CRYOGENIC COOLING ARRANGEMENT FOR SPACE VEHICLES
David Sonnabend, Menlo Park, Calif., assignor to Philco Corporation, Philadelphia, Pa., a corporation of Delaware
Filed Oct. 22, 1962, Ser. No. 232,182
5 Claims. (Cl. 62—239)

This invention relates to a refrigeration system and more particularly to a cryogenic cooling system for space vehicles.

The desirability of the use of various types of cryogenic apparatus in space vehicles has long been recognized. Numerous devices and techniques exist which require cryogenic ambients, which devices and techniques could be used to advantage in space vehicles. Superconducting rectifiers, cavities, electromagnets, and the like, requiring deep-cooling are well known and would be extremely useful in space applications. For example, switching and memory devices for computers comprising "cryotrons," i.e., superconducting switch elements, are candidates for space application. A gyroscope having extremely small drift rates and comprising a superconducting sphere supported in a static magnetic field has obvious space vehicle applications. Others include maser, laser and infrared detectors. Undoubtedly, new cryogenic devices will be developed which will find application in space vehicles.

The use of cryogenic devices and techniques in space vehicles, however, has been delayed by the lack of suitable cryogenic refrigeration systems to meet the formidable refrigeration requirements of such devices. Cryogenic refrigeration systems (called cryostats) are well known. Cryostats are not well adapted for space applications because of their excessive weight and/or power consumption requirements. Further, the transfer of heat in prior art arrangements is generally effected by pumping a cooled liquid past the apparatus to be cooled. With the refrigeration system of this invention, no pumping or moving parts are required in either the establishment of the low temperature or the transfer of heat from the device to be cooled to the low temperature source.

An object of this invention is the provision of a method and means for producing cryogenic temperatures in a space vehicle.

An object of this invention is the provision of a heat sink for use in a space vehicle, which heat sink requires no external source of power during operation thereof.

An object of this invention is the provision of a cryogenic refrigeration system for space vehicles which requires no moving parts or pumping cryogenic fluids for the transfer of heat between the device to be cooled and a heat sink included in the system.

An object of this invention is the provision of a novel shielded chamber, or container, for the improved insulation of a cryogenic means.

An object of this invention is the provision of a novel shielding arrangement for a metallic heat conducting wire which serves to transfer heat from a device to be cooled to a heat sink.

These and other objects and advantages of the invention are achieved by means of a refrigerating system comprising a supply of solid hydrogen in a container within the space vehicle and vented to space when the vehicle has been propelled into a spatial vacuum. For adequate shielding of the solid hydrogen, a metallic radiation shield surrounds the solid hydrogen container. The radiation shield is connected by a metallic heat conducting member to a radiator at the surface of the vehicle. Heat is conducted from the radiation shield to the radiator and there dissipated by radiation into outer space.

Further, in accordance with this invention, refrigeration may be supplied to remote places in the space vehicle by means of insulated wires connected to the solid hydrogen container. From the container the wire extends to a second metallic container which houses the apparatus to be cooled. The wire and container housing the apparatus to be cooled are surrounded by insulated radiation shields connected to radiators at the surface of the vehicle for dissipation by radiation into space.

The invention will be better understood from the following description when taken within the accompanying drawings. In the drawings wherein like reference characters refer to like parts in the several views.

Figure 1:
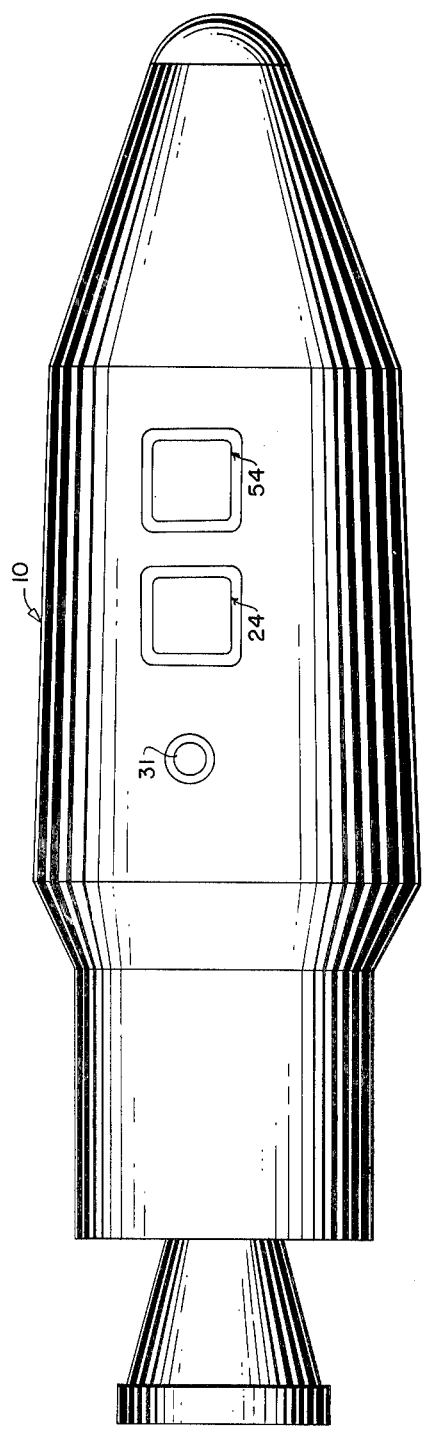
FIGURE 1 is a diagrammatic view of a space vehicle embodying the refrigerating system of this invention.
Figure 2:
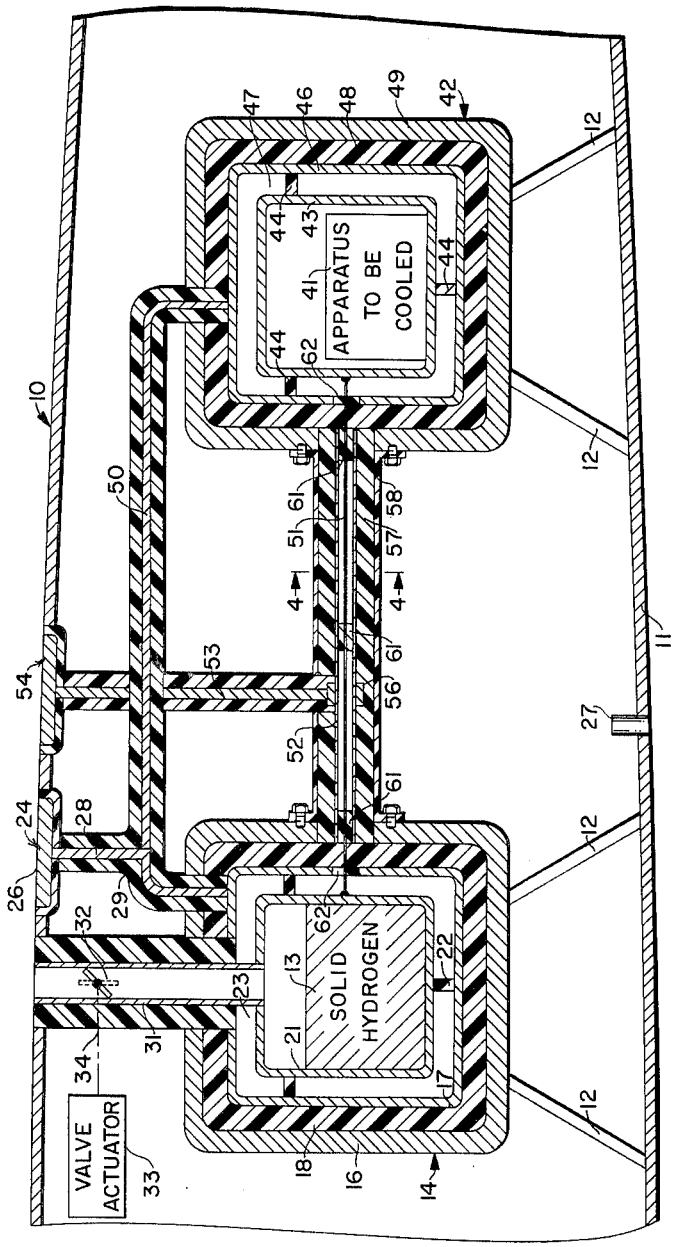
FIGURE 2 is a fragmentary view of the space vehicle showing the novel refrigerating system in cross-section.

Reference is first made to FIGURES 1 and 2 of the drawings wherein the refrigerating system of this invention is shown mounted in a space vehicle 10. The space vehicle is adapted to be propelled beyond the earth's atmosphere into spatial vacuum. As diagrammatically shown in FIGURE 2, the space vehicle comprises a shell 11 within which the refrigerating apparatus is mounted on supporting members 12. A temperature of about 5° K. is obtained by means of solid hydrogen 13 located within a cryostat 14 included in the novel refrigeration system.

The cryostat comprises a casing 16 of metal or like material for mechanical support of elements therewithin. A radiation shield 17 of polished copper, aluminum, or like metal, is located within the casing 16. The shield 17 is held in position and insulated from the casing 16 by an insulating member 18 which preferably comprises one of the so-called "superinsulations." Such an insulating member may comprise, for example, a multiplicity of radiation barriers of aluminum foil separated by glass fiber mats and assembled under vacuum. The metal foil and glass fiber are arranged to provide a long path for heat flowing therethrough. Present superinsulators of such design have an effective thermal conductivity of $2.6 \times 10^{-7}$ watts/cm.-° K.

The solid hydrogen 13 is located within an inner metallic container 21 of highly polished silver, which container is supported a spaced distance from the radiation shield 17 by rig members 22 of laminated nylon, stainless steel, or other material having low thermal conductivity. A sealed chamber 23 is formed completely about the inner metallic container 21 between the container and radiation shield 17, which chamber is evacuated. Suitable means, not shown, may be employed for vacuum pumping the chamber to a pressure of about $10^{-5}$ mm. of Hg, which pressure is maintained by sealing off the chamber.

Under ambient temperatures of about 300° K. within the space vehicle, the combination of the high vacuum chamber 23 and superinsulation 18 alone will not keep the heat leak therethrough to an adequately low level without resort to an extremely thick wall of insulation 18. In order to provide for a refrigerating system of minimum overall size and bulk, the radiation shield 17 is thermally connected to a secondary heat sink, or radiator, 24 comprising a plate which forms a portion of the space vehicle skin. The radiator 24 may comprise a plate of copper or other suitable metal having an external surface 26 of high emissivity. The space vehicle includes an attitude sensing and control system of any suitable design for maintaining the vehicle in a spatial orientation such that the secondary heat sink 24 is directed toward outer space, away from the sum or other large heat producing bodies. Attitude sensing and control systems are well known and may include a sun sensor 27 (located on the vehicle substantially diametrically opposite the radiator 24) and other apparatus, not shown. The radiator 24 is connected through an insulated bar or strap 28 of copper, aluminum, or any other good thermal conducting metal, to the radiation shield 17.

The heat sink temperature of space is about 5° K. If the heat sink surface 26 is of adequate size and the strap 28 properly insulated by insulation 29, the temperature of the radiation shield 17 can be held in the 100–150° K. range. By use of secondary heat sinks in the refrigeration system of this invention, including the radiator 24, the heat loss load on the solid hydrogen heat sink is kept at a tolerable value without resort to large and bulky apparatus. As is well understood, the temperature gradient of the cryostat 14 is divided into two gradient steps by use of the secondary heat sink such that the temperature gradient between the container 21 and radiation shield 17 is less than would exist without the heat sink 24, thereby reducing the heat transfer rate to the solid hydrogen.

In accordance with this invention a passageway comprising an insulated tube 31 extends from the solid hydrogen container 21 through the shell 11 of the vehicle, the purpose of which tube is to vent the solid hydrogen to the high vacuum of outer space. While the space vehicle is in the earth's atmosphere the solid hydrogen container is sealed off from the atmosphere by a closed valve 32 in the tube 31. When the vehicle is propelled beyond the earth's atmosphere, the valve 32 is opened by a valve actuator 33 coupled thereto through a mechanical linkage 34. The actuator may function to open the valve upon receipt of a signal from a ground station, after a predetermined time lapse following take-off, after a suitable altitude has been reached as determined by a pressure-sensing device, or by any other suitable means not shown.

Any suitable method may be used to fill the container 21 with solid hydrogen prior to launching the space vehicle. One suitable method includes filling the container with liquid hydrogen and permitting the hydrogen to boil with the valve 32 open. The refrigeration system cools as the hydrogen boils, and the liquid hydrogen is replenished as required. This process of replenishing the hydrogen as it boils-off is continued until the temperature of the system about reaches the normal boiling point of hydrogen, 20.5° K. At this time a vacuum pump is attached to the tube 31 and the hydrogen is pumped to a low pressure of about $10^{-4}$ mm. Hg. The temperature of the system thereupon continues to drop and will reach about 6° K. The steps of alternately evacuating the air from the container and filling the container with liquid hydrogen are repeated until a substantially full container of solid hydrogen is provided at a temperature of about 6° K. The valve 32 is then closed and the refrigeration system is in condition for launch.

Figure 3:
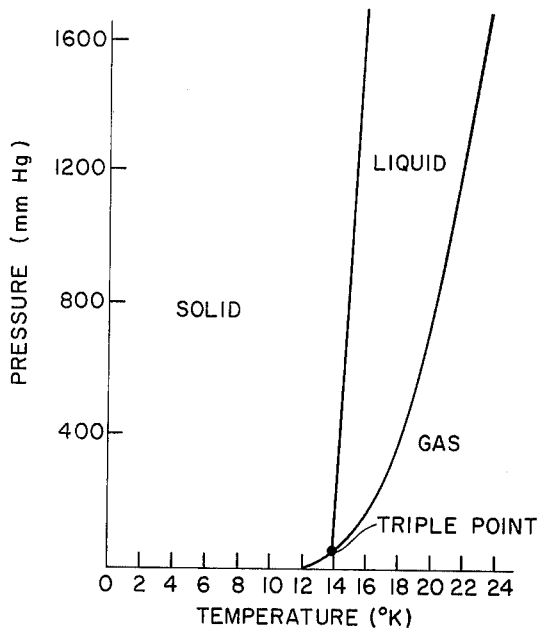
FIGURE 3 is a pressure-temperature phase diagram of hydrogen.

An understanding of the operation and advantages of the solid hydrogen heat sink of this invention will be aided upon examination of the pressure-temperature phase diagram of hydrogen shown in FIGURE 3. The diagram of FIGURE 3 is based on a composition of hydrogen comprising 0.21% ortho-hydrogen and 99.79% para-hydrogen. The triple point is at 13.8° K. and an important characteristic of hydrogen, as illustrated by the chart, is the high vapor pressure at temperatures below the triple point. This, together with the high heat of vaporization of hydrogen, makes solid hydrogen a highly desirable cooling agent.

When the valve 32 is opened (to the broken-like position shown in FIGURE 2) the container 21 of solid hydrogen is vented to the high vacuum of space. Since the ambient pressure of space is well below the equilibrium vapor pressure of the hydrogen, evaporation will take place and the temperature will drop. This process will continue until the evaporation rate stabilizes to match the rate at which heat is admitted, or leaks, into the container 21.

When the solid hydrogen is in equilibrium with its vapor in a sealed and insulated container, the ratio of solid to gas is constant and, therefore, the rate of evaporation of molecules from the solid is exactly matched by the rate of condensation of molecules from the gas. At pressures low enough to make molecular collisions in the gas an infrequent occurrence, the rate of evaporation is not pressure dependent. Therefore, the evaporation rate at any low pressure is substantially determined by the condensation rate at equilibrium. By use of classical kinetic theory, it can be shown that:

$$\dot{m} = .832\, A p_v T^{-\frac{1}{2}} \qquad (1)$$

where $\dot{m}$ = rate at which the hydrogen gas molecules strike the solid hydrogen surface, $A$ = the surface area of the solid hydrogen in square meters, $T$ = temperature in ° K., and $p_v$ = the equilibrium vapor pressure at temperature $T$ in millimeters of mercury (mm.-Hg).

At temperatures well below the triple point (FIGURE 3), however, it may be assumed that the probability is essentially one (1) that a hydrogen gas molecule which strikes the surface of the solid hydrogen will condense. Thus, Equation 1 represents the rate of condensation at equilibrium and, by the above reasoning, Equation 1 also represents the rate of evaporation at any low pressure.

When the container 21 is vented to the vacuum of space with the valve 32 in the open position, the hydrogen vapor is not in equilibrium with the solid hydrogen and the condensation rate is dependent upon the residual pressure in the container. The evaporation rate, on the other hand, is still given by Equation 1 and the rate at which heat is carried away from the surface of the solid hydrogen is given by:

$$P = \dot{m} H_L = .832 A H_L p_v T^{-\frac{1}{2}} \qquad (2)$$

where $P$ = heat dissipation rate in watts, and
$H_L$ = the latent heat of vaporization in joules/kg.

The solid-vapor curve of FIGURE 3 has been measured experimentally only as far down to 10° K. This data is very accurately fit by the equation:

$$\log_{10} p_v = 4.62438 - \frac{47.0172}{T} + .03635 T \qquad (3)$$

The equilibrium vapor pressure $p_v$ may be obtained from Equation 3 for low temperatures, if it is assumed that the solid-vapor curve follows Equation 3 below 10° K. Knowing $p_v$, the heat dissipated per unit area can be computed from Equation 2.

The evaporating molecules must find their way out of the container through the vent 31. Since the hydrogen will probably condense on the entire available surface in the container 21, the total area inside the container is divided between the solid hydrogen surface area designated $A_s$, and the cross-sectional area of the tube 31, designated $A_t$, through which the vapor may escape. When the system has stabilized (not an equilibrium, however) after opening the valve in space, an ambient pressure $p$ will exist inside the container at some temperature T. This pressure may be calculated by repeated application of Equation 1:

$$.832A_s p_v T^{-\frac{1}{2}} - .832A_s p T^{-\frac{1}{2}} - .832A_t p T^{-\frac{1}{2}} = 0 \quad (4)$$

Equation 4 is the statement of the conservation of mass wherein the first term on the left is the rate of evaporation from the surface of the solid hydrogen, the second term is the rate of condensation from the gas and the final term is the rate at which the gas escapes from the container.

Solving Equation 4 for $p$, the following equation is obtained:

$$p = \frac{A_s}{A_s + A_t} p_v \quad (5)$$

Thus, it is seen that the pressure in the container is always slightly less than the equilibrium vapor pressure, while the actual dissipated power is:

$$P = .832 A_t H_L p T^{-\frac{1}{2}} = .832 A_E H_L p_v T^{-\frac{1}{2}} \quad (6)$$

where $$AE = \text{the effective area} = A_t \frac{A_s}{A_s + A_t}$$

By use of the above equations it has been calculated that a supply of solid hydrogen 13 somewhat larger than one (1) cubic foot in size would provide 200 milliwatts of cooling for 120 days at 5.5° K. when operating in outer space with a tube 31 having an effective diameter of three inches.

If possible, the apparatus to be cooled is located within the container 21 for the solid hydrogen. However, such an arrangement is not always possible. In accordance with this invention, novel means of supplying refrigeration to places remote from the heat sink are provided, which means require no pumps or circulating fluids. As seen in FIGURE 2, apparatus 41 to be cooled is located in an insulated container 42 which is similar in construction to the cryostat 14. Briefly, the container 42 comprises an inner metallic container 43 of highly polished silver supported within a radiation shield 46 by ribs 44 of laminated insulating material. The chamber 47 formed between the spaced container 43 and shield 46 is evacuated by suitable vacuum pumping means, not shown. The radiation shield 46 is surrounded by superinsulation 48 and the above-described structure is contained within a casing 49 for mechanical support thereof. A door or other suitable means, not shown, is provided in the container 42 for placement and removal of equipment. The apparatus to be cooled may include, for example, superconducting switching elements, a gyroscope, or other apparatus, as mentioned above. Further, electrical connections, not shown, are made to the apparatus 41 through the container 42, which connections do not provide a good thermal path for heat into the container. The radiation shield 46 is connected through an insulated strap 50 to the secondary heat sink 24 as is the cryostat radiation shield 17.

Figure 4:
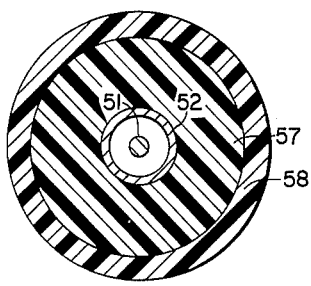
FIGURE 4 is a cross-sectional view taken on line 4—4 of FIGURE 2.

Heat is removed from the apparatus 41 to be cooled by direct metallic conduction through a small-diameter silver wire 51 soldered to and extending between the inner containers 21 and 43. The wire 51 must be well insulated to prevent thermal swamping thereof by heat absorbed from the surrounding environment. In a manner similar to the cryostat 14 and container 42, the wire is surrounded by a radiation shield 52 comprising a concentric tube of copper, or the like, which tube is connected by an insulated strap 53 to another secondary heat sink, or radiator, 54 forming a portion of the vehicle skin. The strap 53 may be connected by a clamp 56 to the radiation shield tube 52 and may be soldered or otherwise suitably secured to the heat sink 54. The radiation shield 52 is surrounded by insulation 57 and supported by means of a flanged tube 58 bolted, or otherwise suitably secured, to the cases 16 and 49. The wire 51 is coaxially supported by spider members of nylon, or the like, in the tube 52, and plugs 62 insulate the wire from the radiation shields 17 and 46. In the diagrammatic views of FIGURES 2 and 4 the heat transfer cable is shown to an enlarged scale for purposes of clarity. In practice, a wire diameter of 1 mm. within a tube 52 having a diameter of 3 mm. would be adequate in many applications. While a separate secondary heat sink 54 is shown for the heat transfer cable, a single secondary heat sink for the radiation shields of the cable, container 42 and cryostat 14 would suffice if made of a sufficiently large size.

Figure 5:
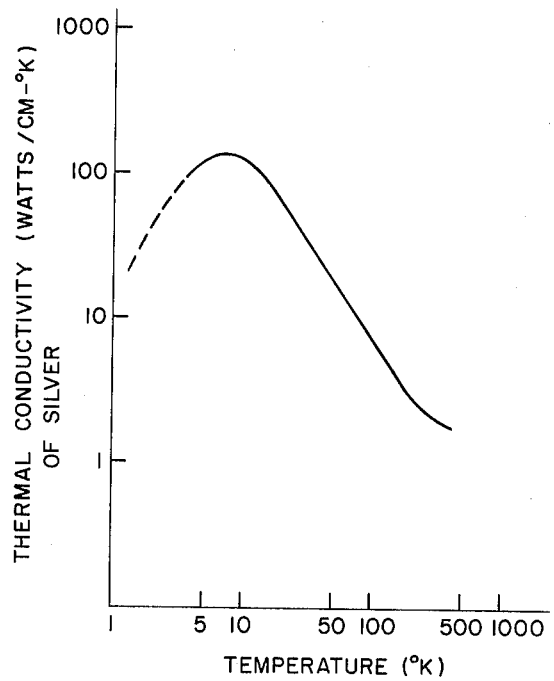
FIGURE 5 is a graph showing the thermal conductivity of silver with respect to temperature.

Certain materials such as copper, silver, aluminum, quartz, and the like, exhibit an increased thermal conductivity with decreasing temperature, down to a transition temperature in the cryogenic region. Silver is of particular interest since, as seen in the graph of FIGURE 5, its thermal conductivity peaks at about 6° K. In the range of 5–10° K. its thermal conductivity, $k$ is equal to or greater than 150 watts/cm.-° K. The heat flow rate through a wire connecting a device at a temperature T with a heat sink at a temperature $T_s$ is:

$$P = \frac{\pi D^2 k}{4 \times 10^4 L}(T - T_s) \quad (7)$$

where

P is the heat flow rate in watts,
D is the diameter of the wire in mm.,
$k$ is the thermal conductivity in watts/cm.-° K., and
L is the wire length in meters.

A high purity silver wire having a diameter of 1 mm. and a length of 1 meter at a temperature difference of 1° K. between ends would transfer 11.8 mw. This capacity for heat transfer is sufficient for many purposes. The invention is not limited to any particular size of wire 51, however, since wires of different diameter may be required for different refrigeration requirements.

The invention having been described in detail in accordance with the requirements of the patent statutes, various changes and modifications will suggest themselves to those skilled in this art. For example, the cooling power of the escaping hydrogen vapor could help cool the radiation shields 21, 43 and 52. Refrigeration systems utilizing sublimated gas for additional cooling are known and no details showing such utilization of the hydrogen vapor are included. It is intended that this and other such changes and modifications shall fall within the spirit and scope of the inventon as recited in the following claims.

I claim:

1. A heat transfer means for transferring heat from apparatus to be cooled to a cryostat in a space vehicle comprising a metallic wire interconnecting the said apparatus to be cooled and the cryostat, a metallic tube surrounding the wire a spaced distance therefrom, insulation surrounding the wire, a radiator at the outer surface of the vehicle, and means connecting the metallic tube to the radiator for conduction of heat from the tube to the radiator, heat from the radiator being dissipated by radiation into outer space.

2. The invention as recited in claim 1 wherein the cryostat comprises a supply of solid hydrogen in a metallic container, and the said wire comprises silver.

3. The invention as recited in claim 2 including a metallic radiation shield surrounding the container a spaced distance therefrom, insulation surrounding the radiation shield, a second radiator at the outer surface of the vehicle, and means connecting the radiation shield to the said second radiator for conduction of heat from the radiation shield to the second radiator, heat from the second radiator being dissipated by radiation into outer space.

4. A system for cooling apparatus in a space vehicle, comprising a cryostat, a metallic wire interconnecting said apparatus and said cryostat, metallic shield means surrounding said apparatus, said wire and said cryostat in spaced relation thereto, insulation surrounding said shield means, radiation means at the outer surface of the vehicle, and heat conduction means connecting said shield means to said radiation means.

5. A system according to claim 4, wherein said cryostat comprises a supply of refrigerant material in a metallic container, said system further comprising a passageway between said container and the outside of the vehicle, and a valve in said passageway.

References Cited by the Examiner

UNITED STATES PATENTS

| 2,265,110 | 12/1941 | Brauer | 62—46 |
| 2,453,946 | 11/1948 | Sulfrian | 62—54 |
| 2,466,696 | 4/1949 | Friswold et al. | 62—384 |
| 2,883,446 | 4/1959 | Nye | 165—185 |
| 2,948,127 | 8/1960 | Carter | 62—384 |
| 2,958,482 | 11/1960 | Summers | 62—239 |
| 3,067,589 | 12/1762 | Dennis et al. | 62—384 |
| 3,068,658 | 12/1962 | Weber | 62—239 |

WILLIAM J. WYE, *Primary Examiner.*

ROBERT A. O'LEARY, *Examiner.*

M. L. MOORE, *Assistant Examiner.*